United States Patent
Bon

(10) Patent No.: US 10,642,632 B2
(45) Date of Patent: May 5, 2020

(54) UPGRADED CLOUD FOUNDRY PLATFORM SYSTEM

(71) Applicant: AGARIK SAS, Saint-Ouen (FR)

(72) Inventor: Christophe Bon, St. Maur des Fosses (FR)

(73) Assignee: AGARIK SAS, Saint-Ouen (FR)

( * ) Notice: Subject to any disclaimer, the term of this patent is extended or adjusted under 35 U.S.C. 154(b) by 0 days.

(21) Appl. No.: 16/229,975

(22) Filed: Dec. 21, 2018

(65) Prior Publication Data
US 2019/0196850 A1    Jun. 27, 2019

(30) Foreign Application Priority Data

Dec. 21, 2017    (FR) ..................... 17 62779

(51) Int. Cl.
| | |
|---|---|
| *G06F 9/46* | (2006.01) |
| *G06F 9/451* | (2018.01) |
| *G06F 9/54* | (2006.01) |
| *G06F 9/50* | (2006.01) |
| *H04L 12/911* | (2013.01) |
| *G06F 8/61* | (2018.01) |
| *G06F 9/455* | (2018.01) |
| *G06F 3/0484* | (2013.01) |
| *H04L 29/06* | (2006.01) |

(52) U.S. Cl.
CPC .............. *G06F 9/451* (2018.02); *G06F 8/61* (2013.01); *G06F 9/45512* (2013.01); *G06F 9/5005* (2013.01); *G06F 9/5055* (2013.01); *G06F 9/54* (2013.01); *H04L 47/78* (2013.01); *G06F 3/04847* (2013.01); *G06F 2209/503* (2013.01); *G06F 2209/508* (2013.01); *G06F 2209/5015* (2013.01); *H04L 2029/06054* (2013.01); *H04Q 2213/135* (2013.01); *H04Q 2213/13516* (2013.01); *H04Q 2213/13525* (2013.01); *H04Q 2213/13526* (2013.01)

(58) Field of Classification Search
None
See application file for complete search history.

(56) References Cited

U.S. PATENT DOCUMENTS

| | | | |
|---|---|---|---|
| 2013/0131840 A1* | 5/2013 | Govindaraj | G05B 19/41865 700/19 |
| 2016/0173646 A1* | 6/2016 | Austel | G06F 9/45558 709/204 |
| 2018/0316772 A1* | 11/2018 | Eberlein | H04L 67/2809 |

* cited by examiner

*Primary Examiner* — Gregory A Kessler
(74) *Attorney, Agent, or Firm* — Hauptman Ham, LLP

(57) ABSTRACT

Cloud Foundry platform system comprising at least: a Cloud controller, a Service Broker, a Service Backend constituted by several Service instances, each linked to at least one Application, in a Droplet Execution Agent pool (DEA pool), a Graphic User Interface (GUI) and a platform diagnostic coupled with probes providing information on the recourses status of the system wherein the hardware and software arrangement forming the Graphic User Interface comprising a set of personalized activated interface cellules which can be manipulated by the user, and each can generate after their activation a piece of specific instruction, each specific instructions will be combined by the Graphic User Interface and transited to the Cloud controller using a routine and according to the resources available determined by the platform diagnostic, in a command, which replace the regular command entered by the user in a Command Line Interface.

4 Claims, 3 Drawing Sheets

UPGRADED CLOUD FOUNDRY PLATFORM SYSTEM

TECHNICAL FIELD OF THE INVENTION

The invention relates to the field of Cloud Foundry platform system.

STATE OF THE PRIOR ART

Cloud Foundry is an open source, multi cloud application platform as a service (PaaS). It is promoted for continuous delivery as it supports the full application development lifecycle, from initial development through all testing stages to deployment. Cloud Foundry's container-based architecture runs applications in any programming language over a variety of cloud service providers. This multi-cloud environment allows developers to and moves those workloads as necessary within minutes with no changes to the application.

However, on a regular Cloud Foundry platform system, it is for the developer a tremendous hassle to provide, manage scale or parameter their application in the cloud. Indeed, such platform only provides a Command Line Interface to transmit commands to the cloud controller.

DISCUSSION OF THE INVENTION

The present invention therefore has the object of proposing a Cloud Foundry platform system, giving the possibility of overcoming at least one portion of the drawbacks of the prior art.

Cloud Foundry platform system comprising at least:
an hardware and software arrangement forming a Cloud controller,
an hardware and software arrangement forming a Service Broker,
an hardware and software arrangement forming a Service Backend constituted by several Service instances, each linked to at least one Application, in a Droplet Execution Agent pool (DEA pool),
an hardware and software arrangement forming a Graphic User Interface (GUI) and
an hardware and software arrangement forming a platform diagnostic coupled with probes providing information on the recourses status of the system
wherein the hardware and software arrangement forming the Graphic User Interface comprising a set of personalized activated interface cellules which can be manipulated by the user, and each can generate after their activation a piece of specific instruction, each specific instructions will be combined by the Graphic User Interface and transited to the Cloud controller using a routine and according to the resources available determined by the platform diagnostic, in a command, which replace the regular command entered by the user in a Command Line Interface.

Cloud Foundry platform system, wherein the Cloud controller is configured to be the Application Program Interface (API) of the Cloud Foundry platform system, which interpret the transmitted command by the hardware and software arrangement forming the Graphic User Interface.

Cloud Foundry platform system, wherein the hardware and software arrangement forming the Graphic User Interface allows creating a service instance provided with specific configuration parameters to the API of the cloud foundry.

Cloud Foundry platform system, wherein the API under the parameters of the service instance provided by the GUI, provision the instance and create a binding to the service broke.

Cloud Foundry platform system, wherein the Service Broker is linked to an autoscaler application and use the information on the recourses status provided by the probes of the platform diagnostic, to automatically scale a specific application according to the resource available, while following the user's chosen parameters corresponding to the manipulated personalized activated interface cellules.

SHORT DESCRIPTION OF THE FIGURES

Other features, details and advantages of the invention will become apparent upon reading the description which follows with reference to the appended figures, which illustrate:

DETAILED DESCRIPTION OF DIFFERENT EMBODIMENTS OF THE INVENTION

Many combinations may be contemplated without departing from the scope of the invention; one skilled in the art will select either one depending on economical, ergonomical, dimensional constraints or others which he/she will have to observe.

Cloud Foundry platform system is powered by Core OSS Cloud foundry which is Open source Platform as a Service. It allows the developer to provide, manage and scale their application in the cloud as hassle free process.

More particularly, according to an embodiment, the device (1) comprises at least:
an hardware and software arrangement forming a Cloud controller (API),
an hardware and software arrangement forming a Service Broker,
an hardware and software arrangement forming a Service Backend constituted by several Service instances, each linked to at least one Application, in a Droplet Execution Agent pool (DEA pool),
an hardware and software arrangement forming a Graphic User Interface (GUI) and
an hardware and software arrangement forming a platform diagnostic coupled with probes providing information on the recourses status of the system Cloud Foundry platform system is accessed by the user through hardware and software arrangement for a Graphic User Interface (GUI) to avoid to pass by a Command Line Interface (CLI).

Indeed, the Graphic User Interface comprising a set of personalized activated interface cellules which can be manipulated by the user, and each can generate after their activation a piece of specific instruction, each specific instructions will be combined by the Graphic User Interface and transited to the Cloud controller using a routine and according to the resources available determined by the platform diagnostic, in a command, which replace the regular command entered by the user in a Command Line Interface.

The Graphic User Interface (GUI) comprises a hardware and software arrangement to form a module of identification of the user. The module compares the identification/security information provided by the user to information beforehand memorized in a security database of the Cloud Foundry platform. If the information matches, the Graphic User Interface (GUI) unlock access to the functionalities and databases of the Cloud Foundry platform, depending of the level agreement regarding the identification/security level of the user memorized in the security database.

Figure 1:
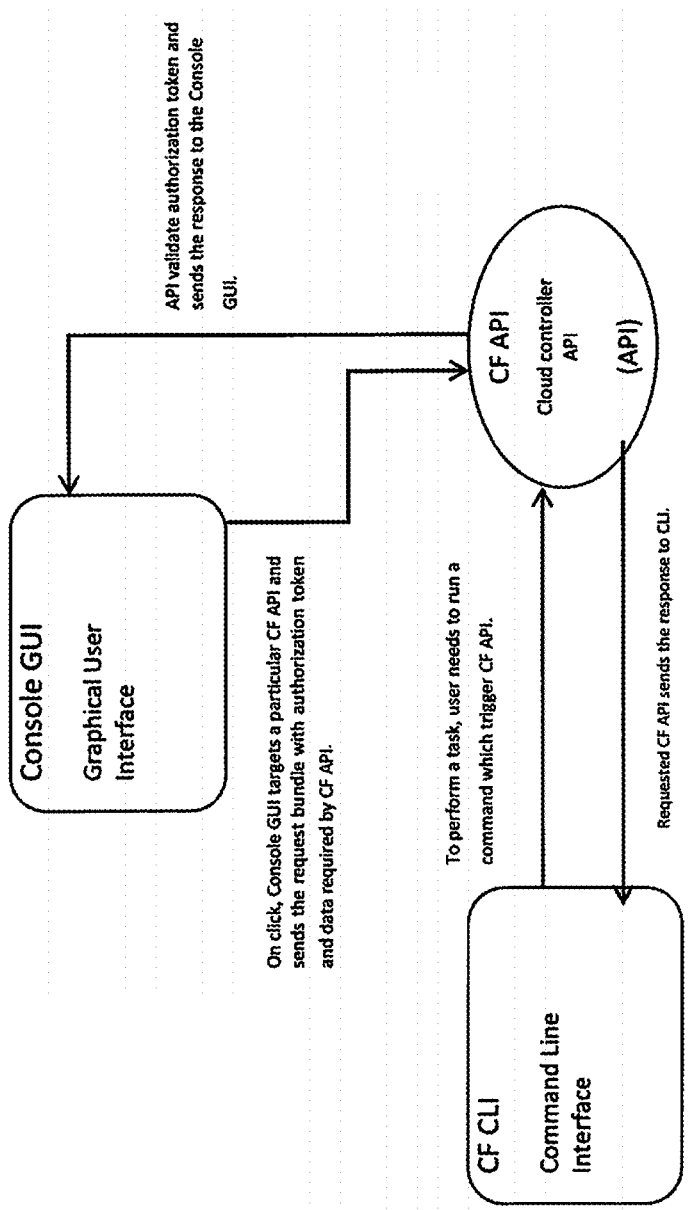
FIG. 1, illustrates the Console GUI interaction with CF API's
Figure 2:
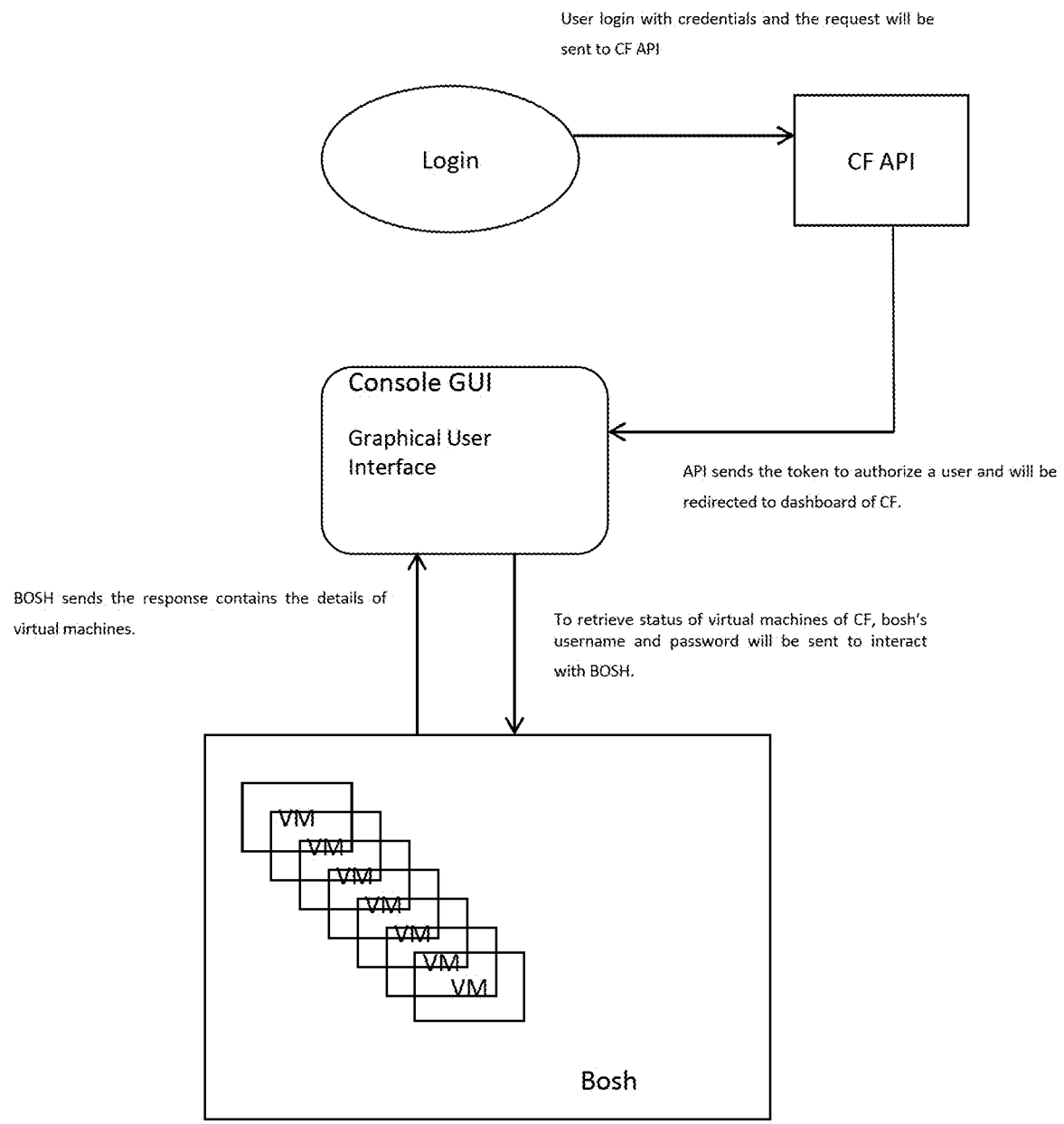
FIG. 2 represents an example of available Platform diagnostics from Console UI interaction with BOSH API's
Figure 3:
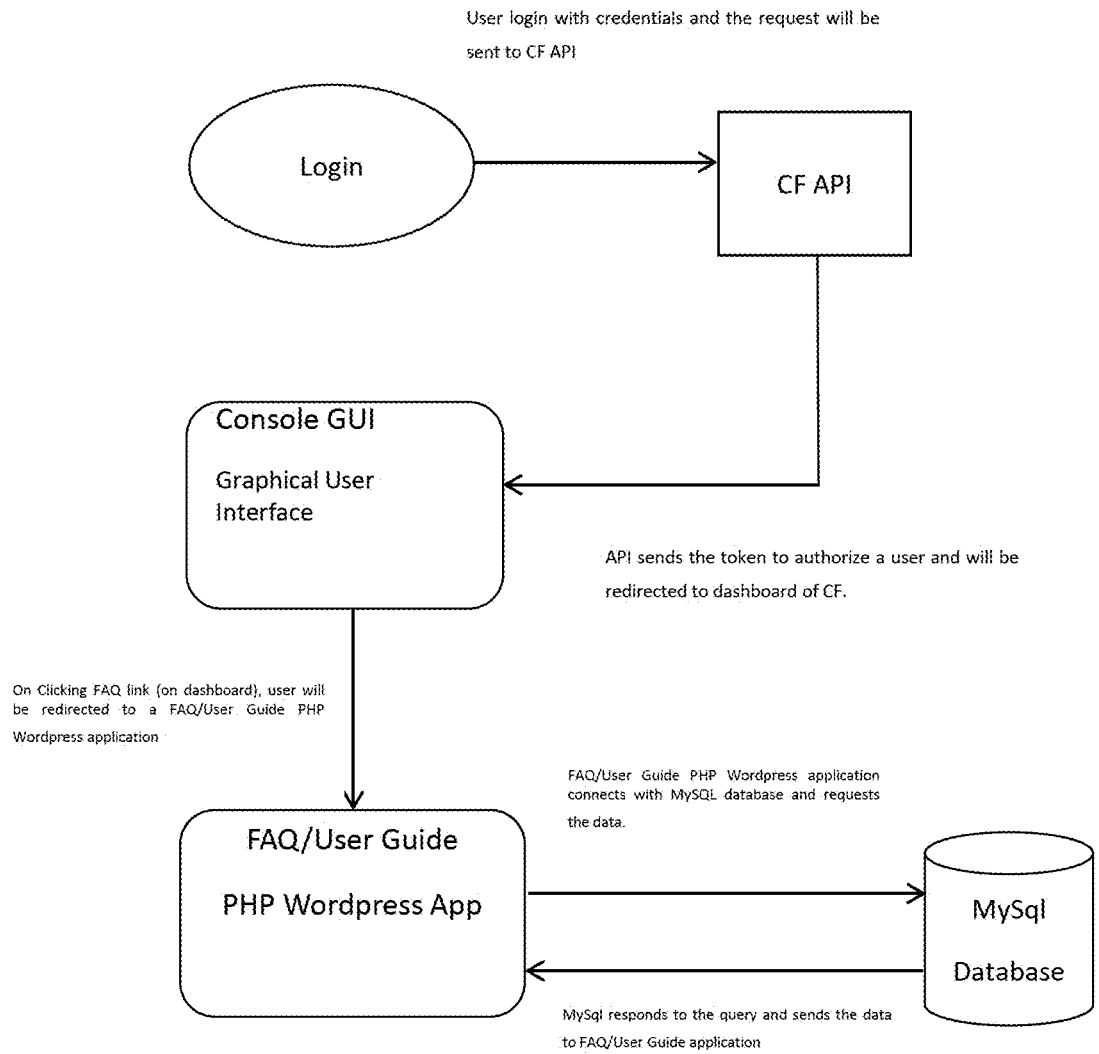
FIG. 3 represents an example of available FAQ/User Guide: PHP Wordpress app interaction with MySQL DB service instance for content.

The Graphic User Interface (GUI) comprises a hardware and software arrangement to allow the display and manipulation by the user of information which are memorized in different databases of the Cloud Foundry platform such as for example MySql databases type. One of these databases includes questions and answers frequently asked. These databases can be accessible trough different applications as for example, PHP Wordpress application as illustrated by the FIG. 3.

In addition, the Graphic User Interface (GUI) through hardware and software arrangement allows the user to perform modification of different databases in the Cloud Foundry platform, depending of the level of identification/security of the user.

Following different embodiment, the Graphic User Interface (GUI) can replace completely the Command Line Interface (CLI), in this case, the Graphic User Interface (GUI) can have access and manage the same or equivalent feature than the Command Line Interface (CLI). In another embodiment, the Graphic User Interface (GUI) through hardware and software arrangement communicate with the Command Line Interface (CLI) in order to transmit the user's command to the Command Line Interface (CLI), which by an hardware and software arrangement will transited to the Cloud controller the command to be executed.

Therefore the Cloud Foundry platform system, currently implements most of features to manage applications and support, directly from the Graphic User Interface (GUI) directly to the Cloud controller/API or from the Graphic User Interface (GUI) to the Cloud controller/API through a Command Line Interface (CLI); these features can be categorized and listed in several modules as:
  Before getting started
  Application lifecycle
  Services integration
  Route and domain management
  Space management
  Org management
  CLI plugins management The Before getting started module is configured to run the following line of commands:
  Config
  Login,l
  Target,t
  Help,h
  Logout,lo The Application lifecycle module is configured to run the following line of commands:
  Applications, a
  Run-task,rt
  Events
  Push,p
  Logs
  Set-env,se
  Start,st
  Ssh
  Create-application-manifest
  Stop,sp
  Application
  Restart,rs
  Env,e
  Restage,rg
  Scale The Services integration module is configured to run the following line of commands:
  Marketplace,m
  Create-user-provided-service,cups, to create a user provided service
  Services,s
  Update-user-provided-services,uups to update the user provided services,
  Create-service,cs
  Create-service-key,csk
  Update-service
  Delete-service-key,dsk
  Delete-service, ds
  Service-keys.sk
  Service
  Service-key
  Bind-service,bs
  Bind-route-service,brs
  Unbind-service,us
  Unbind-route-services,urs The Route and domain management module is configured to run the following line of commands:
  Routes,r
  Delete-route
  Create-domain
  Domains
  Map-route
  Create-route
  Unmap-route These command enables to define a Route (r), delete a Route (r), map a route, create a Route (r), unmap a Route (r) or create a Domain.

The Space management module is configured to run the following line of commands to manage storage spaces:
  Spaces
  Create-space
  Set-space-role
  Space-users
  Delete-route
  Unset-space-role The Org management module is configured to run the following line of commands:
  Orgs,o
  Set-org-role
  Org-users
  Unset-org-role The GUI/CLI plugin management module is configured to run the following line of commands enabling plugin:
  Plugins
  Add-plugin-repo
  Repo-plugins
  Install-plugin
  List-plugin-repos The Cloud controller is configured to be the Application Program Interface (API) of the Cloud Foundry platform system.

The Graphic User Interface (GUI) allows creating a service instance provided with specific configuration parameters to the API of the cloud foundry.

The API under the parameters of the service instance provided by the GUI, provision the instance and create a binding to the Service Broker.

The Service Broker is linked to hardware and software arrangement for autoscaler application and these arrangement uses the information on the recourses status provided by the probes of the platform diagnostic, to automatically scale a specific application according to the resource available, while following the user's chosen parameters corresponding to the manipulated personalized activated interface cellules of the Graphic User Interface (GUI).

It will be easily understood upon reading the present application that the particularities of the present invention, as generally described and illustrated in the figures, may be arranged and designed according to a great variety of different configurations. Thus, the description of the present invention and the related figures are not provided for limiting the scope of the invention but simply illustrating selected embodiments.

One skilled in the art will understand that the technical features of a given embodiment may in fact be combined with features of another embodiment unless the opposite is explicitly mentioned or if it is obvious that these features are incompatible. Further, the technical features described in a given embodiment may be isolated from the other features of this embodiment unless the opposite is explicitly mentioned.

It should be obvious for persons skilled in the art that the present invention allows embodiments under many other specific forms without departing from the field defined by the scope of the appended claims, these embodiments should be considered as an illustration and the invention should not be limited to the details given above.

The invention claimed is:

1. A Cloud Foundry platform system comprising at least:
   a hardware and software arrangement comprising at least one processor and a memory provided with software, the processor being able to execute software stored in the memory to form a Cloud controller,
   a hardware and software arrangement comprising at least one processor and a memory provided with software, the processor being able to execute software stored in the memory to form a Service Broker,
   a hardware and software arrangement comprising at least one processor and a memory provided with software, the processor being able to execute software stored in the memory to form a Service Backend constituted by several Service instances, each linked to at least one Application, in a Droplet Execution Agent pool (DEA pool),
   a hardware and software arrangement comprising at least one processor and a memory provided with software, the processor being able to execute software stored in the memory to form a Graphic User Interface (GUI), and
   a hardware and software arrangement comprising at least one processor and a memory provided with software, the processor being able to execute software stored in the memory to form a platform diagnostic coupled with probes providing information on the resources status of the system,
   wherein the hardware and software arrangement forming the Graphic User Interface comprising a set of personalized activated interface cells which can be manipulated by the user, and each can generate after their activation a piece of specific instruction, each specific instructions will be combined by the Graphic User Interface and transmitted to the Cloud controller using a routine and according to the resources available determined by the platform diagnostic, in a command, which replace the regular command entered by the user in a Command Line Interface, and
   wherein the Service Broker is linked to an autoscaler application and uses the information on the resources status provided by the probes of the platform diagnostic, to automatically scale a specific application according to the resources available, while following user's chosen parameters corresponding to the manipulated personalized activated interface cells.

2. Cloud Foundry platform system according claim 1, wherein the Cloud controller is configured to be the Application Program Interface (API) of the Cloud Foundry platform system, which interpret the transmitted command by the hardware and software arrangement forming the Graphic User Interface.

3. A Cloud Foundry platform system, comprising at least:
   a hardware and software arrangement comprising at least one processor and a memory provided with software, the processor being able to execute software stored in the memory to form a Cloud controller;
   a hardware and software arrangement comprising at least one processor and a memory provided with software, the processor being able to execute software stored in the memory to form a Service Broker;
   a hardware and software arrangement comprising at least one processor and a memory provided with software, the processor being able to execute software stored in the memory to form a Service Backend constituted by several Service instances, each linked to at least one Application, in a Droplet Execution Agent pool (DEA pool);
   a hardware and software arrangement comprising at least one processor and a memory provided with software, the processor being able to execute software stored in the memory to form a Graphic User Interface (GUI); and
   a hardware and software arrangement comprising at least one processor and a memory provided with software, the processor being able to execute software stored in the memory to form a platform diagnostic coupled with probes providing information on the resources status of the system,
   wherein the hardware and software arrangement forming the Graphic User Interface comprising a set of personalized activated interface cells which can be manipulated by the user, and each can generate after their activation a piece of specific instruction, each specific instructions will be combined by the Graphic User Interface and transmitted to the Cloud controller using a routine and according to the resources available determined by the platform diagnostic, in a command, which replace the regular command entered by the user in a Command Line Interface,
   wherein the Cloud controller is configured to be the Application Program Interface (API) of the Cloud Foundry platform system, which interpret the transmitted command by the hardware and software arrangement forming the Graphic User Interface, and
   wherein the hardware and software arrangement forming the Graphic User Interface allows creating a service instance provided with specific configuration parameters to the API of the cloud foundry.

4. Cloud Foundry platform system according to claim 3, wherein the API under the parameters of the service instance provided by the GUI, provision the instance and create a binding to the service broker.

\* \* \* \* \*